(12) United States Patent
Endres et al.

(10) Patent No.: US 7,749,420 B2
(45) Date of Patent: Jul. 6, 2010

(54) METHOD AND APPARATUS FOR PROCESSING OPEN THREE-DIMENSIONAL CORE STRUCTURES SUCH AS FOLDED HONEYCOMB STRUCTURES

(75) Inventors: Gregor Christian Endres, Pfaffenhofen (DE); Hans-Juergen Weber, Verden (DE)

(73) Assignee: Airbus Deutschland GmbH, Hamburg (DE)

( * ) Notice: Subject to any disclaimer, the term of this patent is extended or adjusted under 35 U.S.C. 154(b) by 1044 days.

(21) Appl. No.: 11/083,391

(22) Filed: Mar. 17, 2005

(65) Prior Publication Data

US 2005/0206035 A1    Sep. 22, 2005

Related U.S. Application Data

(60) Provisional application No. 60/600,065, filed on Aug. 9, 2004.

(30) Foreign Application Priority Data

Mar. 17, 2004   (DE)  .................. 10 2004 013 144

(51) Int. Cl.
*B28B 7/30* (2006.01)
*B28B 1/14* (2006.01)
*B29C 49/00* (2006.01)
*D03D 3/08* (2006.01)
*B32B 1/00* (2006.01)
*E04C 2/34* (2006.01)

(52) U.S. Cl. .................. 264/313; 428/175; 428/174; 52/793.1; 264/299; 264/571

(58) Field of Classification Search .................. 428/175, 428/174; 264/313; 52/793.1
See application file for complete search history.

(56) References Cited

U.S. PATENT DOCUMENTS

| 2,569,826 | A |   | 10/1951 | Packard |
|---|---|---|---|---|
| 2,576,530 | A |   | 11/1951 | Medal |
| 2,855,664 | A | * | 10/1958 | Griffith et al. .................. 29/424 |
| 2,963,128 | A |   | 12/1960 | Rapp |
| 3,176,387 | A | * | 4/1965  | Argueso, Jr. et al. .......... 29/423 |

(Continued)

FOREIGN PATENT DOCUMENTS

DE        2 316 061        10/1973

(Continued)

*Primary Examiner*—Monica A Huson
*Assistant Examiner*—Michael T Piery
(74) *Attorney, Agent, or Firm*—W. F. Fasse; W. G. Fasse

(57) ABSTRACT

A method and an apparatus facilitate the processing of a core structure for a composite sandwich structure. The core has an open three-dimensional structure and is not self-supporting due to an insufficient strength or stiffness. The method involves temporarily providing a support arrangement on the core structure to mechanically support and stabilize it, then subjecting the supported core structure to the desired processing, and then separating and removing the core structure and the support arrangement from one another. The processing can involve immersion into a processing liquid such as a curable resin, or mechanical machining operations. The support arrangement preferably includes a core impression that is surfacially form-fitting on a structured surface of the core structure. The apparatus includes a support arrangement including a core impression to be disposed on a surface of the core structure. The core impression may be formed of a polymer, a metal, or a casting material.

23 Claims, 2 Drawing Sheets

U.S. PATENT DOCUMENTS

| | | |
|---|---|---|
| 3,305,996 A | 2/1967 | Shapiro |
| 3,402,068 A * | 9/1968 | Wilkins ................. 427/382 |
| 3,449,157 A | 6/1969 | Wandel |
| 3,886,023 A | 5/1975 | Deplante |
| 3,887,990 A | 6/1975 | Wilson |
| 4,001,474 A | 1/1977 | Hereth |
| 4,034,135 A | 7/1977 | Passmore |
| 4,061,812 A * | 12/1977 | Gilwee et al. ........... 428/117 |
| 4,265,688 A | 5/1981 | Gorski |
| 4,370,372 A | 1/1983 | Higgins et al. |
| 4,410,427 A | 10/1983 | Wydeven |
| 4,445,956 A * | 5/1984 | Freeman et al. ......... 156/154 |
| 4,812,193 A | 3/1989 | Gauron |
| 5,316,828 A * | 5/1994 | Miller .................. 428/182 |
| 5,378,099 A | 1/1995 | Gauron |
| 5,443,779 A | 8/1995 | Ichikawa |
| 5,750,235 A | 5/1998 | Yoshimasa |
| 5,993,580 A | 11/1999 | Nakayama et al. |
| 6,187,123 B1 * | 2/2001 | Chenier et al. ......... 156/89.22 |
| 6,193,830 B1 | 2/2001 | Unrath |
| 6,245,407 B1 * | 6/2001 | Wang et al. ............ 428/116 |
| 6,713,008 B1 * | 3/2004 | Teeter .................. 264/258 |
| 6,837,018 B1 | 1/2005 | Hagel et al. |
| 6,837,659 B2 | 1/2005 | Oberkofler |
| 2003/0087049 A1 | 5/2003 | Hachenberg et al. |
| 2005/0204693 A1 | 9/2005 | Endres et al. |
| 2005/0208273 A1 | 9/2005 | Endres et al. |
| 2005/0208274 A1 | 9/2005 | Endres et al. |

FOREIGN PATENT DOCUMENTS

| | | |
|---|---|---|
| DE | 89 15 724 | 6/1991 |
| DE | 43 21 316 | 1/1995 |
| DE | 297 12 684 | 11/1998 |
| DE | 101 46 201 | 4/2003 |
| DE | 10146201 A1 * | 4/2003 |
| DE | 101 54 063 | 5/2003 |
| EP | 0 264 870 | 4/1988 |
| EP | 0 273 515 | 9/1990 |
| EP | 0 589 054 | 3/1994 |
| JP | 06344449 | 12/1994 |

* cited by examiner

METHOD AND APPARATUS FOR PROCESSING OPEN THREE-DIMENSIONAL CORE STRUCTURES SUCH AS FOLDED HONEYCOMB STRUCTURES

CROSS-REFRENCE TO REALATED APPLICATION

This U.S. Non-Provisional Application claims the benefit under 35 U.S.C. §119(e) on U.S. Provisional Application 60/600,065, filed on Aug. 9, 2004, the entire disclosure of which is incorporated herein by reference.

PRIORITY CLAIM

This application is based on and claims priority under 35 U.S.C. §119 of German Patent Application 10 2004 013 144.9, filed on Mar. 17,2004, the entire disclosure of which is incorporated herein by reference.

FIELD OF THE INVENTION

The invention relates to a method for processing core structures with an open three-dimensional structure, especially a folded honeycomb structure or folded cell comb apparatus for processing core structures with an open three-dimensional structure, especially a folded comb structure.

BACKGROUND INFORMATION

Due to their extraordinarily good ratio of stiffness or strength to density, core composites have a broad range of application especially in the field of aircraft construction.

Well-known conventional core composites are generally formed of an upper and a lower cover layer or cover ply, between which is located, for example, a honeycomb-type core structure formed of vertically extending cells with a hexagonal cross section, for increasing the stiffness of the resulting composite sandwich structure.

For example metallic corrosion-protected aluminum foils, or non-metallic materials, such as Nomex®- or Kevlar®/ N636-paper for example, are used for forming the core structure. Both the Nomex®-paper as well as the Kevlare/N636-paper are coated with phenolic resin in a submersion process for increasing the mechanical strength thereof.

Honeycomb-type core structures with cells extending perpendicularly to the major plane of the core possesses a relatively high inherent or self-strength and stiffness, even by themselves, i.e. without the cover layers provided thereon to form a composite sandwich structure. It is therefore readily possible to carry out various processing steps on such a core by itself, without problems and without requiring additional support for the core. For example, such a honeycomb-type core may be submerged in a processing liquid, e.g. for impregnating or coating the core with phenolic resin, or such a core may be mechanically processed or machined, e.g. by boring, milling, cutting, grinding, grit-blasting, etc., because the honeycomb-type core is inherently stiff enough and strong enough to be self-supporting while such processes are carried out.

In contrast to the above described core composites having true honeycomb cell configurations extending perpendicularly to the plane of the core, new types of core composites, especially formed of three-dimensional folded or pleated comb structures, comprise an open or drainable structure. Namely, such pleated or folded core structures include fold or pleat valleys that form open channels extending continuously in the plane of the composite structure, i.e. along or parallel to the cover layers from edge-to-edge of the composite structure. Thus, the core channels of such a core composite remain drainable or ventilatable through the edges even after the opposite major surfaces of the core structure have been covered with the cover layers. Thereby, for example, it is possible to guide various types of lines (e.g. electrical lines, hydraulic lines, water lines, air lines, etc.) through the core composite without previously having to cut or machine a passage therethrough while impairing the mechanical properties of the core composite.

In comparison to true honeycomb-type core structures, however, core structures with a folded or pleated structure may have a lower inherent or self-strength and may thus not be self-supporting before being sandwiched between the cover layers. For this reason, such folded or pleated core structures cannot be subjected to further processing, for example involving a submersion of the core structure in a phenolic resin bath or a mechanical processing or machining, without further measures, because the unsupported core structure would sag, bend, collapse, crush, break, tear or the like when subjected to the processing.

Thus, the standard core processing methods and apparatuses according to the state of the art are not usable without further measures for processing open core structures, for example by surface processing, surface coating, milling, boring, cutting, grinding, grit-blasting, etc.

SUMMARY OF THE INVENTION

An object of the invention is to provide a method as well as an apparatus for processing open core structures, especially core structures with a folded or pleated cell comb structure that is not self-supporting due to an inadequate strength or stiffness. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a method of processing a core structure for a composite structure, comprising the steps:

a) providing a core structure that has an open three-dimensional configuration and that alone is not self-supporting due to an insufficient strength and/or stiffness;

b) temporarily providing a support arrangement on the core structure to mechanically support and stabilize the core structure;

c) while the core structure is supported and stabilized by the support arrangement, subjecting the core structure to a processing; and d) after the processing, separating and removing the core structure and the support arrangement from one another.

The above objects have further been achieved according to the invention in an apparatus for processing a core structure for a composite structure. The core structure has an open three-dimensional configuration, and has opposite first and second major surfaces, and is not self-supporting due to an insufficient strength or stiffness. The apparatus comprises a support arrangement adapted to mechanically support and stabilize the core structure during processing thereof. The support arrangement comprises a first core impression adapted to be disposed on at least a partial area of the first major surface of the core structure, thereby supporting the core structure so that an intended processing thereof can be carried out.

A simple processing of the core structure is possible because, according to the invention, the core structure is temporarily provided with a support arrangement for mechanical support and stabilization thereof. In the inventive apparatus, the support arrangement preferably includes at least one bottom core impression of a core structure bottom surface on at least certain areas and/or at least one top core impression of a core structure top surface on at least certain areas.

Further developments and advantageous embodiments of the invention are set forth in the following patent claims. Further advantages arise from the following detailed description of the invention.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
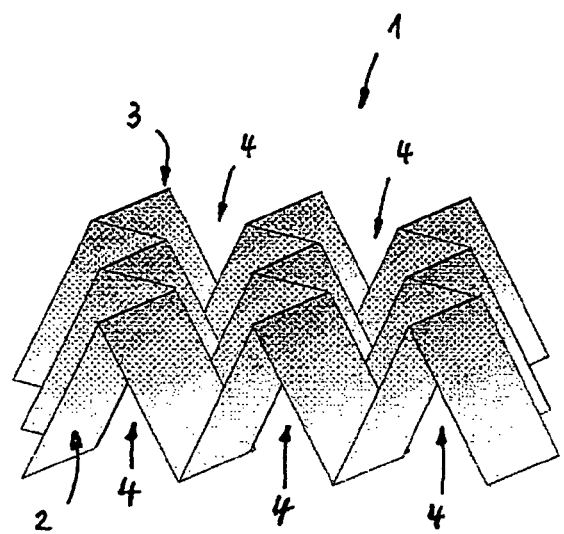
FIG. 1 is a perspective view of an open three-dimensional core structure.

FIG. 1 shows an example of an open or drainable three-dimensional core structure 1 for forming a core composite. In this regard, the core structure 1 is preferably configured with three-dimensional folded or pleated combs or cells forming fold valleys that in turn form open channels extending along the fold valleys. Through-going channels 4 are recognizable on a bottom side or surface 2 and a top side or surface 3 of the core structure 1. The channels may be straight linear channels, or may have a zig-zag configuration as shown, or some other non-linear multi-axial compound folded configuration. The channels 4 may, for example, be used for guiding electrical or hydraulic lines (or any other types of lines) through the core structure 1. In this regard, due to the openness of the core structure, no bored holes or openings, which could impair the characteristics of the core structure, are necessary.

The core structure 1 may, for example, be formed of metallic and corrosion-protected aluminum foils. Alternatively, for example, Nomex®- or Kevlar®/N636-paper, which is coated with phenolic resin in a submersion process for example, can be used to form the core structure 1.

Figure 2:
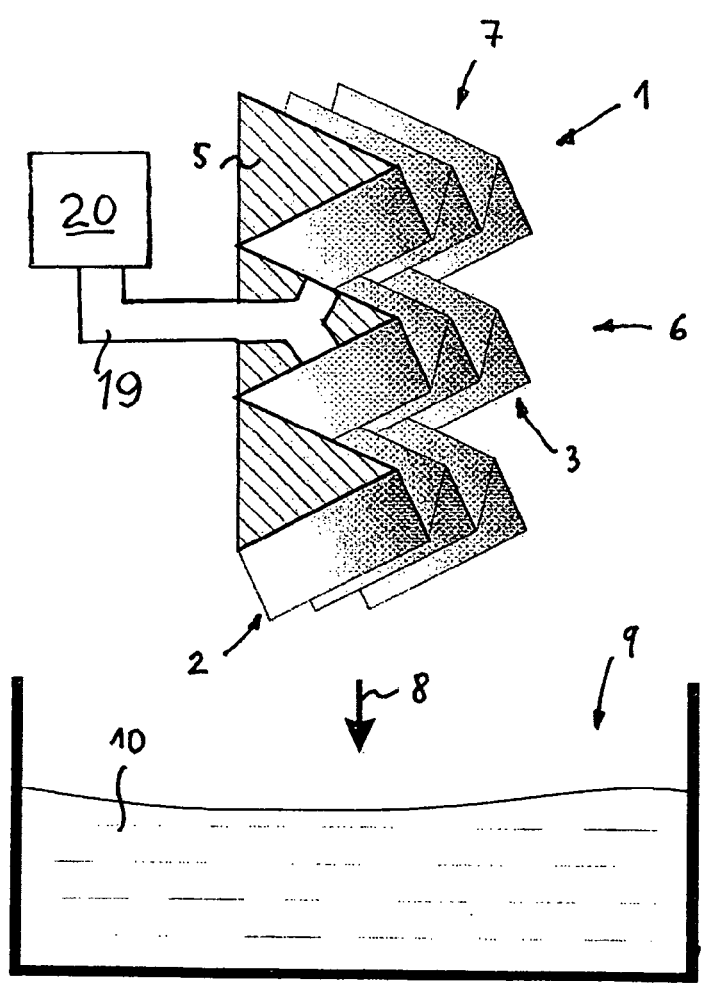
FIG. 2 is a schematic illustration representing the processing of a core structure according to the inventive method.

FIG. 2 shows the process sequence of the processing of the core structure 1 according to a first variant of the inventive method.

For processing the core structure top side 3, first a bottom core impression 5 is inserted into the core structure bottom side 2. The bottom core impression 5 forms a support arrangement 6 which structurally supports and stabilizes the core structure 1. The core impression 5 in this regard lies in a form-fitting manner on the core structure bottom side 2, and preferably fills the fold valleys on the bottom side 2, for forming a processing unit 7 of the core structure 1 together with the core impression 5. In the illustrated example embodiment of FIG. 2, the core structure 1 lies fully surfacially on the bottom core impression 5, which is, however, not necessarily required. The bottom core impression 5 can be formed from the core structure bottom side 2 by means of conventionally known copy molding or casting methods.

The bottom core impression 5 is preferably formed of a material that has good separating characteristics, for example a silicone elastomer. For example, the casting material Aircast3700® has been shown to be advantageous for producing the bottom core impression 5. If applicable, the core impression 5 formed with the casting material Aircast3700® is to be reinforced through suitable constructive measures, for example a backside supporting under-construction. Alternatively it is possible to form the bottom core impression 5 of a metallic material, which is thereafter coated with a material that has good separating characteristics.

The core impression 5 can furthermore have devices or arrangements by means of which the core structure 1 can be fixed or secured on the bottom core impression 5. In this regard, for example, through-going bored vacuum holes 19 can be provided through the bottom core impression 5, and connected to a vacuum source 20 that generates and applies a reduced pressure between the core impression 5 and the bottom core surface 2 so as to suction-hold and thus fix the core structure 1 on the bottom core impression 5. Alternatively, clamp devices may be provided on the bottom core impression 5 to mechanically fix the core structure 1 thereon.

Following thereafter, the processing unit 7 formed of the core structure 1 as well as the bottom core impression 5 is brought into a processing bath 9 as indicated by an arrow 8. The processing bath 9 may, for example, be filled with a liquid synthetic plastic 10, for example a curable phenolic resin, for coating and/or impregnating the core structure 1. The introduction of the core structure 1 into the processing bath 9 can be repeated multiple times, after completion of suitable curing processes.

Following thereafter, the bottom core impression 5 is lifted off or otherwise separated from the core structure bottom side 2.

Next, an upper core impression, not shown in FIG. 2, can be applied onto the core structure top side 3, thereby now leaving the bottom side 2 exposed while supporting the core structure 1 from the top side 3 thereof, in order to similarly subject the core structure bottom side 2 to a coating and/or impregnation process in the processing bath 9. The process sequence of coating and/or impregnation of the core structure bottom side 2 in this regard can correspond to the above described method with respect to the processing of the core structure top side 3.

The processing bath 9 can furthermore serve to condition the core structure bottom side 2 and/or the core structure top side 3, for example to improve the adhesion characteristics of the core structure 1 through erosive processes.

Figure 3:
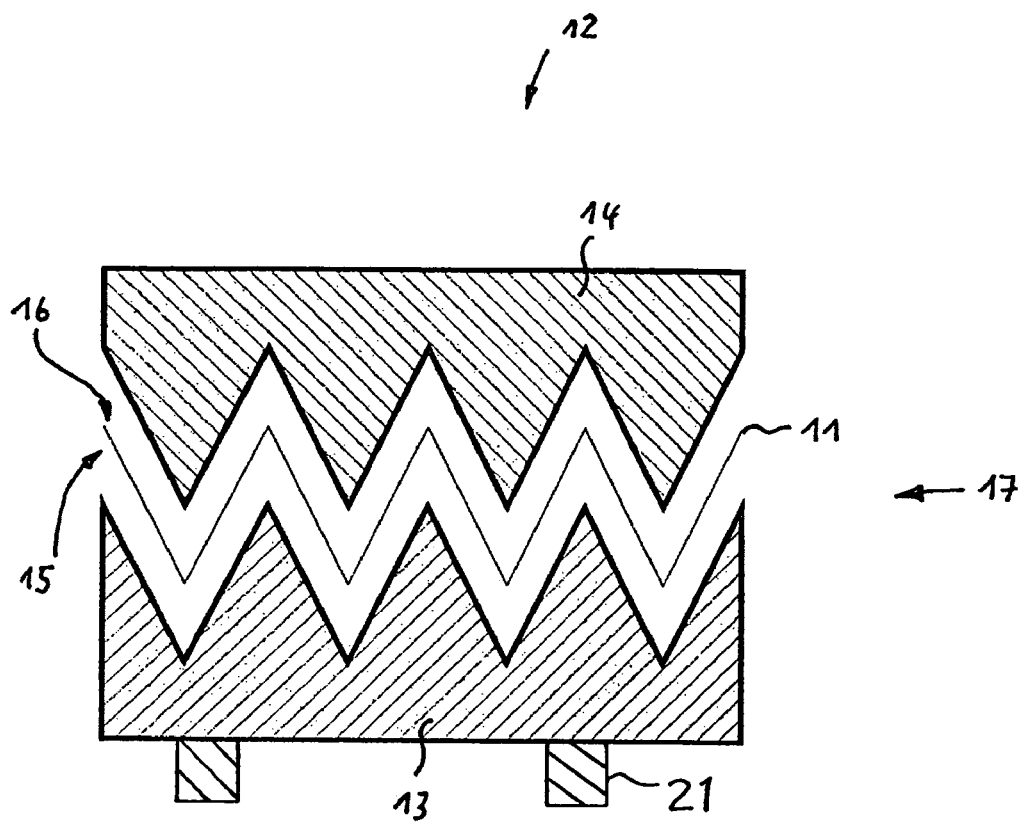
FIGS. 3, 4 are sectional views schematically showing two successive stages of processing of a core structure with the apparatus according to the invention.
Figure 4:
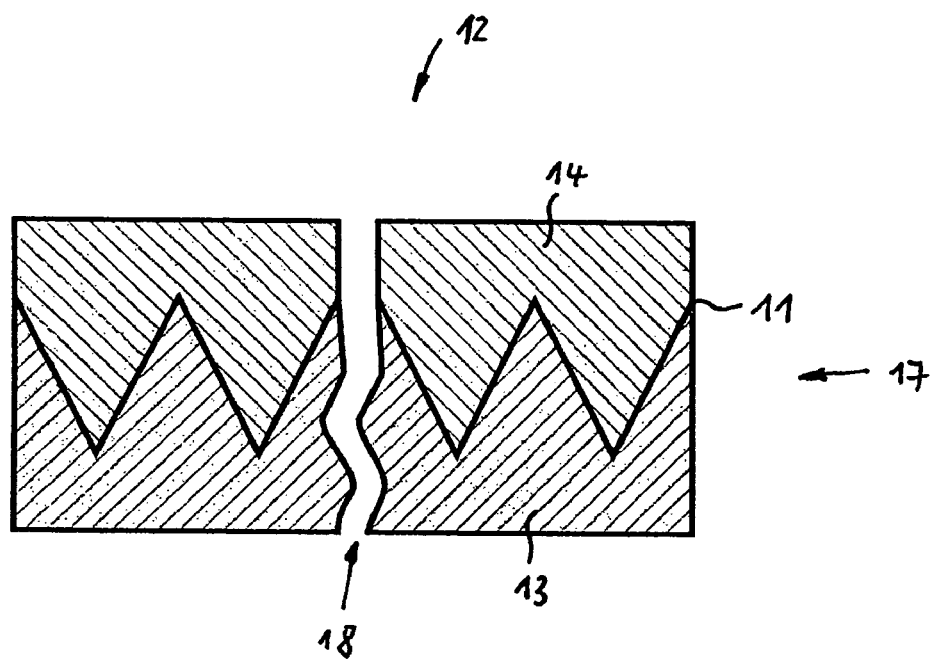

FIGS. 3 and 4 show the processing of a core structure 11 by means of an example embodiment of the support apparatus 12 according to the invention.

The support apparatus 12 is formed of a bottom core impression 13 and a top core impression 14, which form the actual support arrangement for the core structure 11. The bottom core impression 13 as well as the top core impression 14 are embodied form-fitting to the core structure 11. The core impressions 13, 14 are produced in correspondence to the explanations relating to the inventive method set forth further above, for example through copy molding or casting of a core structure bottom side 15 and a core structure top side 16 with a suitable material as specified above. Namely, the above explanations relating to the method using the bottom core impression 5 correspondingly apply to the selection of the material of the core impressions 13, 14. Also as mentioned above, the core impressions 13, 14 may further be supported or strengthened by a suitable understructure 21 in the manner of a framework or the like.

The fixing or securing of the bottom core impression 13 and the top core impression 14 on the core structure 11 for forming a processing unit 17 can, once again, for example, be carried out by producing a reduced pressure in the area of the core structure 11 by means of suitable arrangements or devices. Alternatively, clamping elements, for example clamps, can be used. When the core structure 11 is correspondingly fixed or clamped in place by means of the inventive support apparatus 12, and thereby mechanically supported, then the core structure 11 can be subjected to the intended liquid, chemical, mechanical or other processing.

For example, the formation of a separating cut 18 into the processing unit 17 is illustrated in FIG. 4 as an example of a mechanical processing that can be carried out. In this regard, the core impressions 13 and 14 can be cut or separated together with the core structure 11 supported therebetween. Thereby, the core structure 11 can be cut cleanly and precisely, without tearing, fraying, splintering, bending, or the like.

After the processing of the core structure 11, the fixing or securing devices are released, and then the bottom and top core impressions 13, 14 are lifted off of the core structure 11, for opening the support apparatus 12. Then, the processed core structure 11 may be further assembled into the desired composite sandwich panel or the like, for example by applying respective cover layers on opposite sides of the core structure.

The bottom and the top core impressions 13, 14 can alternatively be embodied so as not to fully surfacially cover the core structure bottom side 15 or the core structure top side 16. For example, the core impressions 13, 14 may have a lattice- or grid-like structure with openings therein exposing areas of the respective bottom or top surfaces 15, 16, whereby at least a partial processing of the core structure bottom side 15 and/or of the core structure top side 16 is possible even while the respective surface is supported by the associated core impression.

If the support apparatus 12 according to a further embodiment variation, for example, comprises only the bottom core impression 13, then a mechanical surface processing of the core structure top side 16, for example by means of erosive processes for improving the adhesive characteristics, can take place. The same applies to a processing of the core structure bottom side 15.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of processing a core structure for a composite structure, comprising the steps:
   a) providing a folded valley core structure that has opposite first and second major surfaces having a structured shape configured with an open three-dimensionally contoured configuration with continuous transverse fold valley channels extending respectively along each of said major surfaces of said core structure, and that is not a honeycomb core having open cells extending perpendicularly to a major plane of the core, and that alone is not self-supporting due to an insufficient strength and/or stiffness;
   b) temporarily providing a first support arrangement including at least a first core support arranged form-fittingly on at least a first partial area of said first major surface of said core structure to mechanically support and stabilize said core structure having said three-dimensionally contoured configuration, wherein said first core support form-fittingly fills said fold valley channels at least in said first partial area on only said first major surface and not on said second major surface, wherein said first core support comprises a form-fitting first core impression, and wherein said step b) comprises disposing said first core impression form-fittingly on at least said first partial area of said first major surface of said core structure;
   c) while said core structure is supported and stabilized by said first support arrangement, subjecting said core structure to a first processing;
   d) after said first processing, then separating and removing said core structure and said first support arrangement from one another;
   e) temporarily providing a second support arrangement comprising a form-fitting second core impression on said core structure to mechanically support and stabilize said core structure, by disposing said second core impression form-fittingly on at least a second partial area of said second major surface of said core structure, wherein said second core impression form-fittingly fills said fold valley channels at least in said second partial area on only said second major surface and not on said first major surface;
   f) while said core structure is supported and stabilized by said second support arrangement, subjecting said core structure to a second processing; and
   g) after said second processing, separating and removing said core structure and said second support arrangement from one another; and
   h) after said step d), sandwiching said core structure between two cover layers.

2. The method according to claim 1, wherein said step b) further comprises fixing said first core impression on said core structure after said disposing.

3. The method according to claim 2, wherein said fixing comprises applying a reduced pressure or vacuum between said first core impression and said first major surface of said core structure.

4. The method according to claim 2, wherein said fixing comprises clamping said first core impression onto said core structure with clamp elements.

5. The method according to claim 1, further comprising forming said first core impression by casting or molding an impression material to form-fittingly match said fold valley channels of said structured shape of said first major surface of said core structure.

6. The method according to claim 5, wherein said casting or molding comprises temporarily supporting said core structure and casting or molding said impression material using said first major surface of said core structure as a form or mold while said core structure is temporarily supported.

7. The method according to claim 1, wherein said disposing of said first core impression on said first major surface comprises temporarily supporting said core structure and applying a curable or hardenable impression material onto said first major surface and then curing or hardening said impression material so as to stiffen said impression material and form thereof said first core impression while said core structure is temporarily supported.

8. The method according to claim 1, wherein said first processing and said second processing comprise carrying out a same process for said first processing in said step c) and for said second processing in said step f).

9. The method according to claim 1, wherein said step c) comprises subjecting said second major surface of said core structure to said first processing, and said step f) comprises subjecting said first major surface of said core structure to said second processing.

10. The method according to claim 1, wherein said first support arrangement and said core structure together form a processing unit in said steps b) and c), and said first processing in said step c) comprises introducing said processing unit at least partially into a processing bath.

11. The method according to claim 10, wherein said processing bath contains a processing liquid, and wherein said introducing of said processing unit into said processing bath comprises dipping said processing unit partially into said processing liquid, or submerging said processing unit entirely in said processing liquid, or moving said processing unit through said processing liquid, so that said core structure becomes coated and/or impregnated with said processing liquid.

12. The method according to claim 11, wherein said processing liquid comprises a curable or hardenable polymer material.

13. The method according to claim 1, wherein said step b) further comprises fixing said core structure on said first support arrangement, and said first processing in said step c) comprises a mechanical machining of said core structure.

14. A method of processing a core structure for a composite structure, comprising the steps:
  a) providing a folded valley core structure that has an open three-dimensionally contoured configuration with a three-dimensionally contoured first major surface and a three-dimensionally contoured second major surface with continuous transverse fold valley channels extending respectively along each of said major surfaces, wherein said core structure alone is not self-supporting due to an insufficient strength and/or stiffness;
  b) temporarily providing a first core support on only said first major surface of said core structure to mechanically support and stabilize said core structure, wherein said first core support has a contoured shape that form-fittingly mates with said fold valley channels on said first major surface;
  c) while said core structure is supported and stabilized by said first core support, leaving said fold valley channels on said second major surface open and exposed, and subjecting said second major surface of said core structure to a first processing;
  d) after said first processing, separating and removing said core structure and said first core support from one another;
  e) after said first processing, temporarily providing a second core support on only said second major surface of said core structure to mechanically support and stabilize said core structure, wherein said second core support has a contoured shape that form-fittingly mates with said fold valley channels on said second major surface;
  f) while said core structure is supported and stabilized by said second core support, leaving said fold valley channels on said first major surface open and exposed, and subjecting said first major surface of said core structure to a second processing; and
  g) after said second processing, separating and removing said core structure and said second core support from one another.

15. The method according to claim 1, wherein said first partial area is a lattice-shaped area and said first core support has a lattice shape with openings therein corresponding to said lattice-shaped area.

16. The method according to claim 1, wherein said first core support is formed of a flexurally stiff polymer material.

17. The method according to claim 1, wherein said first core support is formed of a flexurally stiff metal material.

18. The method according to claim 17, further comprising applying a release coating on said metal material.

19. The method according to claim 7, wherein said impression material is a silicone elastomer.

20. The method according to claim 1, wherein said first support arrangement further includes a mechanically rigid supporting understructure that carries and supports said first core support thereon.

21. The method according to claim 1, wherein an impression surface of said first core support is a continuous solid surface that is form-fitting on said first partial area of said first major surface of said core structure.

22. The method according to claim 1, wherein an impression surface of said first core support is a perforate mesh or grid surface that is form-fitting on said first partial area of said first major surface of said core structure.

23. The method according to claim 3, wherein said reduced pressure or vacuum is applied through at least one suction hole in said first core impression, by a suction source connected to said suction hole.

* * * * *

UNITED STATES PATENT AND TRADEMARK OFFICE
CERTIFICATE OF CORRECTION

| | | |
|---|---|---|
| PATENT NO. | : 7,749,420 B2 | |
| APPLICATION NO. | : 11/083391 | |
| DATED | : July 6, 2010 | |
| INVENTOR(S) | : Gregor Christian Endres et al. | |

It is certified that error appears in the above-identified patent and that said Letters Patent is hereby corrected as shown below:

Column 1,
Line 10, after " § 119(e)", replace "on" by --of--;
Line 16, after "claims", insert --the--;
Line 25, after "cell comb", insert
    --structure. Furthermore, the invention relates to an--;
Line 43, after "as the", replace "Kevlare" by --Kevlar®--;

Column 4,
Line 37, after "2", there is no paragraph break.

Signed and Sealed this
Eighteenth Day of October, 2011

David J. Kappos
*Director of the United States Patent and Trademark Office*